(12) United States Patent
Serniuck

(10) Patent No.: US 7,165,968 B2
(45) Date of Patent: Jan. 23, 2007

(54) APPARATUS AND METHOD FOR SEALING INJECTION UNIT AND SPRUE

(75) Inventor: Nicholas W. Serniuck, Oakville (CA)

(73) Assignee: Husky Injection Molding Systems Ltd. (CA)

( * ) Notice: Subject to any disclaimer, the term of this patent is extended or adjusted under 35 U.S.C. 154(b) by 259 days.

(21) Appl. No.: 10/879,621

(22) Filed: Jun. 30, 2004

(65) Prior Publication Data
US 2006/0003046 A1    Jan. 5, 2006

(51) Int. Cl.
B29C 45/16    (2006.01)
(52) U.S. Cl. .................. 425/557; 425/569; 425/573
(58) Field of Classification Search ............. 425/560, 425/561, 568, 569, 557, 573
See application file for complete search history.

(56) References Cited

U.S. PATENT DOCUMENTS

| | | | | |
|---|---|---|---|---|
| 2,680,883 | A * | 6/1954 | Ashbaugh | 425/166 |
| 4,078,875 | A * | 3/1978 | Eckardt | 425/217 |
| 4,080,147 | A | 3/1978 | Dumortier | |
| 4,207,051 | A | 6/1980 | Wright et al. | 425/556 |
| 4,315,726 | A * | 2/1982 | Semerdjiev et al. | 425/560 |
| 4,334,847 | A * | 6/1982 | Schauffele | 425/227 |
| 4,966,545 | A | 10/1990 | Brown et al. | 425/557 |
| 5,044,927 | A | 9/1991 | DiSimone et al. | 425/567 |
| 5,112,212 | A * | 5/1992 | Akselrud et al. | 425/557 |
| 5,143,733 | A * | 9/1992 | Von Buren et al. | 425/130 |
| RE35,256 | E | 5/1996 | von Buren et al. | 425/572 |
| 5,968,562 | A | 10/1999 | Schad et al. | |
| 6,413,076 | B1 | 7/2002 | Dray, Sr. | 425/562 |

FOREIGN PATENT DOCUMENTS

EP    0 624 449 A2    11/1994
WO    WO 02/058908 A1    8/2002

* cited by examiner

Primary Examiner—Yogendra N. Gupta
Assistant Examiner—Emmanuel S Luk
(74) Attorney, Agent, or Firm—Katten Muchin Rosenman LLP

(57) ABSTRACT

An injection molding sealing apparatus configured to be installed in a coinjection hot runner with a coinjection nozzle, the coinjection nozzle having at least two melt channels ending at the same gate. The sealing apparatus is configured for sealing the coinjection hot runner to a hot runner sprue bushing, which is coupled to an injection assembly, during relative movement between (i) the coinjection hot runner and (ii) a stationary mold or machine section. Sealing structure is configured to seal the coinjection molding hot runner sprue bushing to the coinjection hot runner during the relative movement. Coupling structure is configured to provide relative movement between the injection assembly and the stationary mold or machine section.

20 Claims, 4 Drawing Sheets

APPARATUS AND METHOD FOR SEALING INJECTION UNIT AND SPRUE

BACKGROUND OF THE INVENTION

1. Field of the Invention

The present invention relates to improved sealing apparatus and method for sealing an injection unit and a sprue bushing in a coinjection molding machine, and in particular to such apparatus and method where the hot runner assembly and mold are movable with respect to stationary sections of the mold, wherein the interface of at least one coinjection nozzle with at least one hot runner sprue bushing remains sealed throughout the molding cycle (which includes relative movement of the hot runner system). Preferably, the coinjection molding machine comprises a second injection unit mounted adjacent the movable mold section and travels therewith.

2. Description of Related Art

Coinjection molding is typically used to mold multi-layered plastic packaging articles having a laminated wall structure. Each layer is typically passed through a different annular or circular passageway in a single nozzle structure and each layer is partially, sequentially, injected through the same gate. Some coinjection hot runner systems include shooting pots to meter material of one plastic resin so that each cavity of a multi-cavity mold receives an accurate dose of that resin in the molding cycle. In configurations where the melt distribution (hot runner manifold) is mounted in a moving section of the mold it is desirable to maintain this connection.

U.S. Pat. No. 4,080,147 to Dumortier discloses a hot runner manifold mounted in a moving section of the mold. A shooting pot is associated with each nozzle/cavity combination. The shooting pot is charged while the mold is open (FIG. 5), the action causes the hot runner and mold assembly to move away from the manifold backing plate a distance "b". The mold is closed in FIG. 6, the action causes a valve to block the melt channel to prevent backflow of the resin toward the feeding unit. Then the distance "b" is closed up by the continuing motion of the machine clamp that causes the resin in the shooting pot to be injected into the mold cavity partially filling it. However, there is no teaching of how the injection unit connects to the sprue bushing of the hot runner system, or whether this connection is intermittent or constant.

U.S. Pat. No. Re. 35,256 to von Buren discloses a clamping piston acting perpendicular to the injection unit's axis to intermittently effect a sealing connection to the hot runner system of the mold. The connection is released and sealed during each molding cycle.

U.S. Pat. No. 5,044,927 to DiSimone discloses a latching mechanism for clamping the injection unit's nozzle to the bushing at the end of sprue bar of a stack mold in order to alleviate unequal clamping. The connection is released and sealed during each molding cycle.

U.S. Pat. No. 4,207,051 to Wright and U.S. Pat. No. 5,910,327 to Schad both disclose a stack mold having a telescoping sprue bar that adjusts its length as the mold opens and closes. However the sprue bar's connection with the injection unit's nozzle is released and sealed during each molding cycle.

U.S. Pat. No. 6,413,076 to Dray discloses a machine nozzle that continuously engages the mold's sprue bushing throughout the molding cycle. An extension from the nozzle remains within a corresponding bore extending from the sprue bushing allowing relative axial movement between the two without separation. The channel through the extension and sprue is open only when the injection unit is advanced toward the mold and its transverse channel at one end is aligned with a local widening of the channel in the sprue bushing; consequently it can only provide communication for the melt in this single position. There is no disclosure of communication for the melt in a range of positions in which the nozzle is engaged within the sprue.

WO 02/058908 A1 to Clarke discloses a multi-cavity mold employing a hot runner having shooting pots. The shooting pots are charged while the mold is open without any corresponding movement of the hot runner or cavity plate assembly of the mold. The shooting pots are discharged by the action of closing the mold by the machine clamp, the resin being discharged to completely fill the cavities as the cavity itself closes. The shooting pot piston extends from the cavity side of the mold and is directly acted on by the core plate of the mold during closing. Valves included in the hot runner ensure backflow of the resin toward the feeding unit is prevented during injection.

U.S. Pat. No. 6,152,721 to Schad discloses a shooting pot actuation device that comprises a movable plate mounted behind the stationary platen of the machine having actuation rods extending through the platen to act on the shooting pot pistons mounted in the hot runner of the mold. The hot runner assembly is also mounted to the stationary platen of the mold so that the shooting pot piston actuators never separate contact with their corresponding rod actuators mounted on the movable plate.

U.S. Pat. No. 4,966,545 to Brown discloses a shooting pot piston moved in two discrete motions in order to deliver two metered amounts of resin to the same mold cavity from the same shooting pot. The piston is actuated by tandem mounted cylinders in the mold plate, and valves are used to prevent backflow to the feeding unit during injection. See also:

U.S. patent application Ser. No. 10/879,576 entitled INJECTION MOLDING MACHINE SHOOTING POT WITH INTEGRAL CHECK VALVE;

U.S. patent application Ser. No. 10/879,581 entitled INJECTION MOLDING MACHINE SPIGOTTED SHOOTING POT PISTON;

U.S. patent application Ser. No. 10/879,575 entitled APPARATUS AND METHOD FOR ACTUATION OF INJECTION MOLDING SHOOTING POTS;

U.S. patent application Ser. No. 10/879,582 entitled CONTROL SYSTEM FOR A DYNAMIC FEED COINJECTION PROCESS;

U.S. patent application Ser. No. 10/880,494 entitled HOT RUNNER COINJECTION NOZZLE WITH THERMALLY SEPARATED MELT CHANNELS;

U.S. patent application Ser. No. 10/880,493 entitled COINJECTION MOLDING COOLED SHOOTING POT CYLINDER; and U.S. patent application Ser. No. 10/887,353 entitled APPARATUS AND METHOD FOR INJECTION MOLDING SHOOTING POT WEDGE FEATURE.

Thus, what is needed is an injection molding machine wherein the hot runner system is disposed in a relatively movable section of the mold, and wherein the interface of the nozzle and the sprue bushing remains sealed throughout the molding cycle.

SUMMARY OF THE INVENTION

It is an advantage of the present invention to overcome the problems of the related art and to provide a coinjection molding machine hot runner system that is disposed in a relatively movable section of the mold, such that the nozzle-sprue bushing interface remains sealed throughout the molding cycle.

According to a first aspect of the present invention, a novel combination of structure and/or steps are provided for injection molding sealing apparatus configured to be installed in a coinjection hot runner with a coinjection nozzle, the coinjection nozzle having at least two melt channels ending at the same gate. The sealing apparatus is configured for sealing the coinjection hot runner to a hot runner sprue bushing, which is coupled to an injection assembly, during relative movement between (i) the coinjection hot runner and (ii) a stationary mold or machine section. Sealing structure is configured to seal the coinjection molding hot runner sprue bushing to the coinjection hot runner during the relative movement. Coupling structure is configured to provide relative movement between the injection assembly and the stationary mold or machine section.

According to a second aspect of the present invention, a unique combination of structure and/or steps are provided for an injection molding sealing apparatus configured to be installed in a coinjection hot runner with a coinjection nozzle, the coinjection nozzle having at least two melt channels ending at the same gate. The sealing apparatus is configured to seal (i) the coinjection hot runner, which is relatively movable with respect to a relatively stationary platen, and (ii) a hot runner sprue bushing. A shooting pot is configured to be coupled to the coinjection hot runner, and a shooting pot piston is configured to discharge melt from the shooting pot upon relative movement of the coinjection hot runner and the platen. The hot runner sprue bushing is configured to be fixedly coupled to the coinjection hot runner, and an injection unit is coupled to the hot runner sprue bushing. Coupling structure is configured to couple the injection unit to the platen so that the injection unit is relatively movable with respect to the platen.

According to a third aspect of the present invention, a unique combination of structure and/or steps are provided for an injection molding sealing apparatus configured to be installed in a coinjection hot runner with a coinjection nozzle, the coinjection nozzle having at least two melt channels ending at the same gate. A sprue bushing is configured to be fixedly coupled to a hot runner manifold so as to maintain a seal therebetween throughout a relative movement between the hot runner manifold and a stationary platen. An injection unit is configured to be movably coupled to the platen and fixedly coupled to the sprue bushing.

According to a fourth aspect of the present invention, a unique combination of structure and/or steps are provided for injection molding sealing apparatus configured to be installed in a coinjection hot runner with a coinjection nozzle, the coinjection nozzle having at least two melt channels ending at the same gate. Means are provided for injecting a melt from an injection unit, which is coupled to a stationary platen, through a sprue bushing, into a hot runner manifold, and into a shooting pot. The means for injecting causing the hot runner manifold and the platen to move away from each other. Means are provided for sealing the sprue bushing to the hot runner manifold throughout the movement away. Means are also provided for causing the hot runner manifold and the platen to move toward each other, the movement toward causing the melt in the shooting pot to be discharged toward the coinjection nozzle. The means for sealing sealing the sprue bushing to the hot runner manifold throughout the movement toward.

BRIEF DESCRIPTION OF THE DRAWINGS

Exemplary embodiments of the presently preferred features of the present invention will now be described with reference to the accompanying drawings.

DETAILED DESCRIPTION OF THE PRESENTLY PREFERRED EXEMPLARY EMBODIMENTS

1. Introduction

The present invention will now be described with respect to several embodiments in which a plastic resin coinjection molding hot runner system is disposed in a movable section of the mold, and an injection unit is movably coupled to a stationary mold section of the mold (or to a stationary platen of the machine) so as to move with the hot runner system. This maintains a good seal between the injection unit sprue bushing and the hot runner melt channels during movement of the hot runner system. However, the injection unit could be stationary, and could be coupled to a moving mold section containing the hot runner system. The preferred coinjection molding unit comprises a coinjection molding machine in which a first injection unit is movably mounted to the stationary mold section (or to a stationary platen of the machine) and a second injection unit is mounted to the moving mold section.

2. The Structure of the First Embodiment

Figure 1:
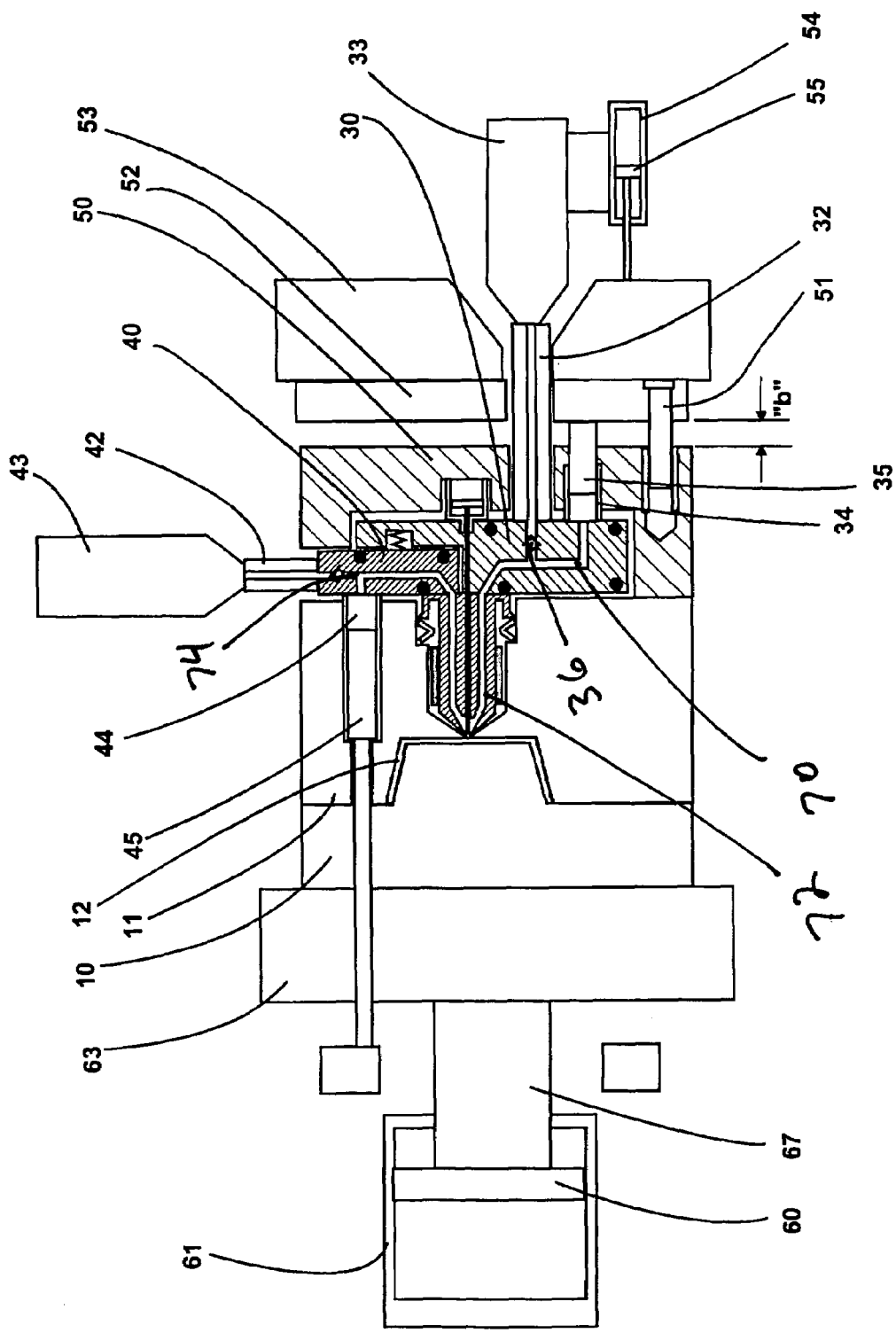
FIG. 1 is a schematic section view of a coinjection hot runner mold having the hot runner mounted in a movable plate shown in the shooting pot charged position.

FIG. 1 shows a schematic section view of a coinjection hot runner mold having a core plate assembly 10, a cavity plate assembly 11, a mold cavity 12, a first shooting pot 34 mounted on a first hot runner manifold 30, that is charged by a first injection unit 33 through a first sprue bushing 32. The first sprue bushing 32 is mounted in sealing engagement with the first hot runner manifold 30 using bolts. The first hot runner manifold 30 is mounted in a movable manifold plate 50 so that it can reciprocate along guide pins 51 that are mounted in a manifold backing plate 52. The first shooting pot 34 has a shooting pot piston 35 that is mounted on the manifold backing plate 52. A second hot runner manifold 40 is also mounted in the movable manifold plate 50 and has a second shooting pot 44 mounted thereto. The second shooting pot 44 has a second shooting pot piston 45 and is charged by a second injection unit 43 that is mounted via a second sprue 42 directly to the second hot runner manifold 40.

The mold is mounted between a stationary platen 53 and moving platen 63 of a clamp (not shown). The moving platen 63 is moved by a piston 60 operating inside a cylinder 61, or alternatively could be moved by conventional toggle mechanisms well known in the art. The first injection unit 33 conveys melt to the first sprue bushing 32 attached to the first hot runner manifold 30. Notably, the first injection unit 33 is movably mounted such that a cylinder 54 and a piston 55 can move the first injection unit 33 with respect to the stationary platen 53 while maintaining good sealing contact between the first sprue bushing 32 and both the first injection unit 33 and the first hot runner manifold 30, throughout the movement stroke "b" of the manifold plate 50. For example, the distance "b" may be 25 mm. The cylinder 54 may also be used to cause the first injection unit 33 to be separated from the sprue bushing 32 for purging and other non-molding operations, when required.

3. The Process of the First Embodiment

In operation, both the first injection unit 33 and the second injection unit 43 charge their respective shooting pots by delivering a predetermined amount of resin through their respective sprues and manifold melt channels. In so doing, the resin entering the first shooting pot 34 causes the first shooting pot piston 35 to retract, which in turn causes the movable manifold plate 50 and the cavity plate assembly 11 to move away from the manifold backing plate 52, thereby creating separation distance "b" as shown in FIG. 1.

Figure 2:
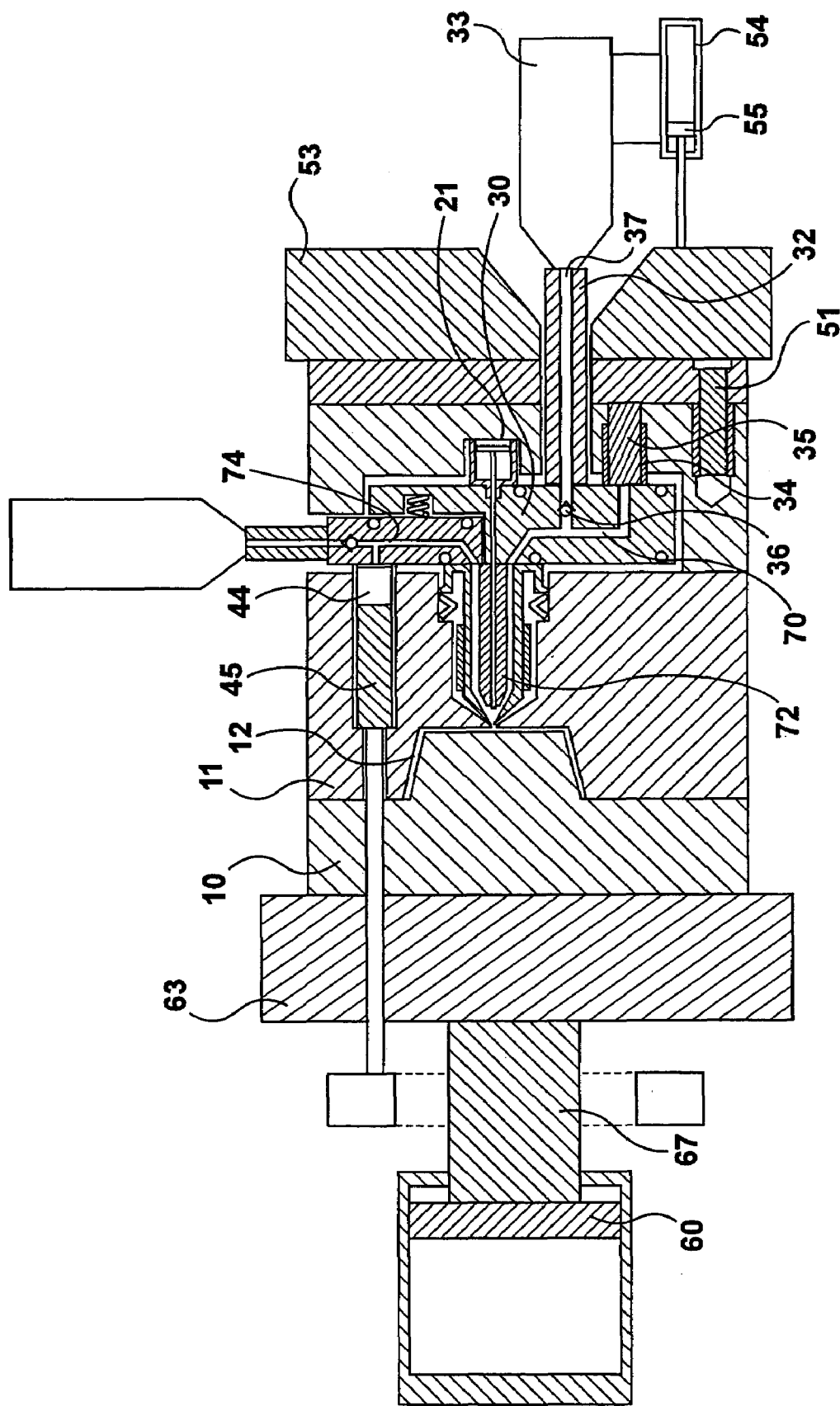
FIG. 2 is a schematic section view of the FIG. 1 embodiment showing the shooting pot in the discharged position.

As shown in FIG. 2, the piston 60 is then energized to cause the mold assembly to take up or close the distance "b", thereby causing the first shooting pot piston 35 to displace the resin in the first shooting pot 34 along the first manifold melt channels 70, through the nozzle 72, to enter the mold cavity 12. The resin is prevented from back-flowing into the first injection unit 33 by a check valve 36 used to block this path (See, for example U.S. patent application Ser. No. 10/879,576 entitled INJECTION MOLDING MACHINE SHOOTING POT WITH INTEGRAL CHECK VALVE.

Before, during, or after the first shooting pot is discharged, the second shooting pot piston 45 is energized to displace the resin in the second shooting pot 44 along the second manifold channels 74, through the nozzle 72, to enter the mold cavity 12. A third feeding of first resin from the first injection unit 33 may follow to fill and pack the mold cavity, if desired. After the mold cavity 12 is filled, the mold is cooled. If the shooting pots 34 and 44 have not yet been recharged, it is done so at this stage. After the molded part in mold cavity 12 has cooled sufficiently, the mold is opened by movement of the moving platen 63 and the part ejected.

4. The Second Embodiment

Figure 3:
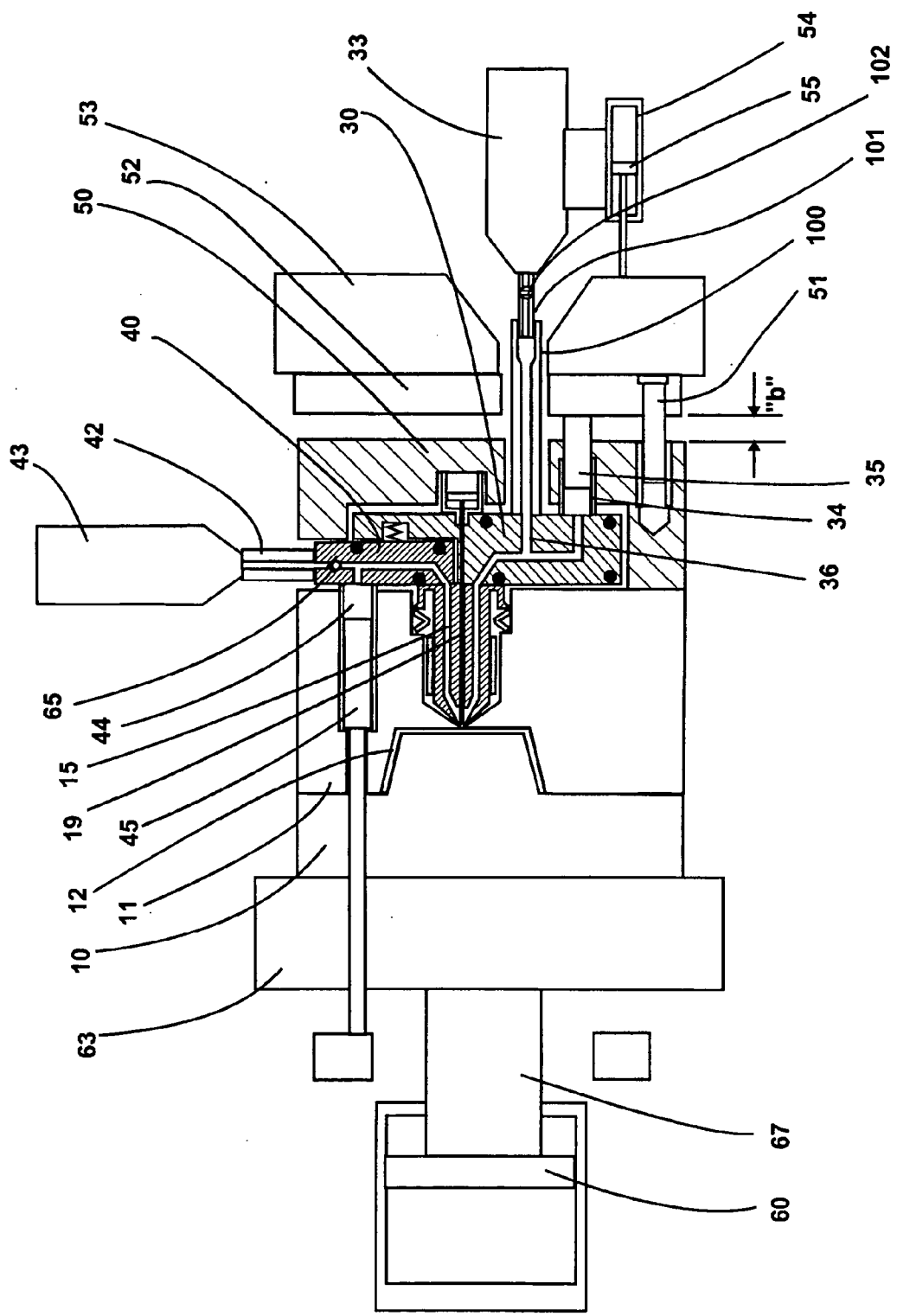
FIG. 3 is a schematic section view of a second embodiment of a coinjection hot runner mold having the hot runner mounted in a movable plate shown in the shooting pot charged position.

FIG. 3 shows a second embodiment in which a sprue bushing 100 has a channel configuration that accepts a first injection unit spigot nozzle 101 in a sealing, sliding manner, thus comprising a slidable coupling. The spigot nozzle 101 has a rotary shut-off valve 102 that replaces the check valve 36. Thus, as the movable manifold plate 50 moves either away from the manifold backing plate 52 or towards it (taking up the distance "b"), the sprue bushing 100 and spigot nozzle 101 remain engaged and sealed throughout the molding cycle.

5. The Third Embodiment

Figure 4:
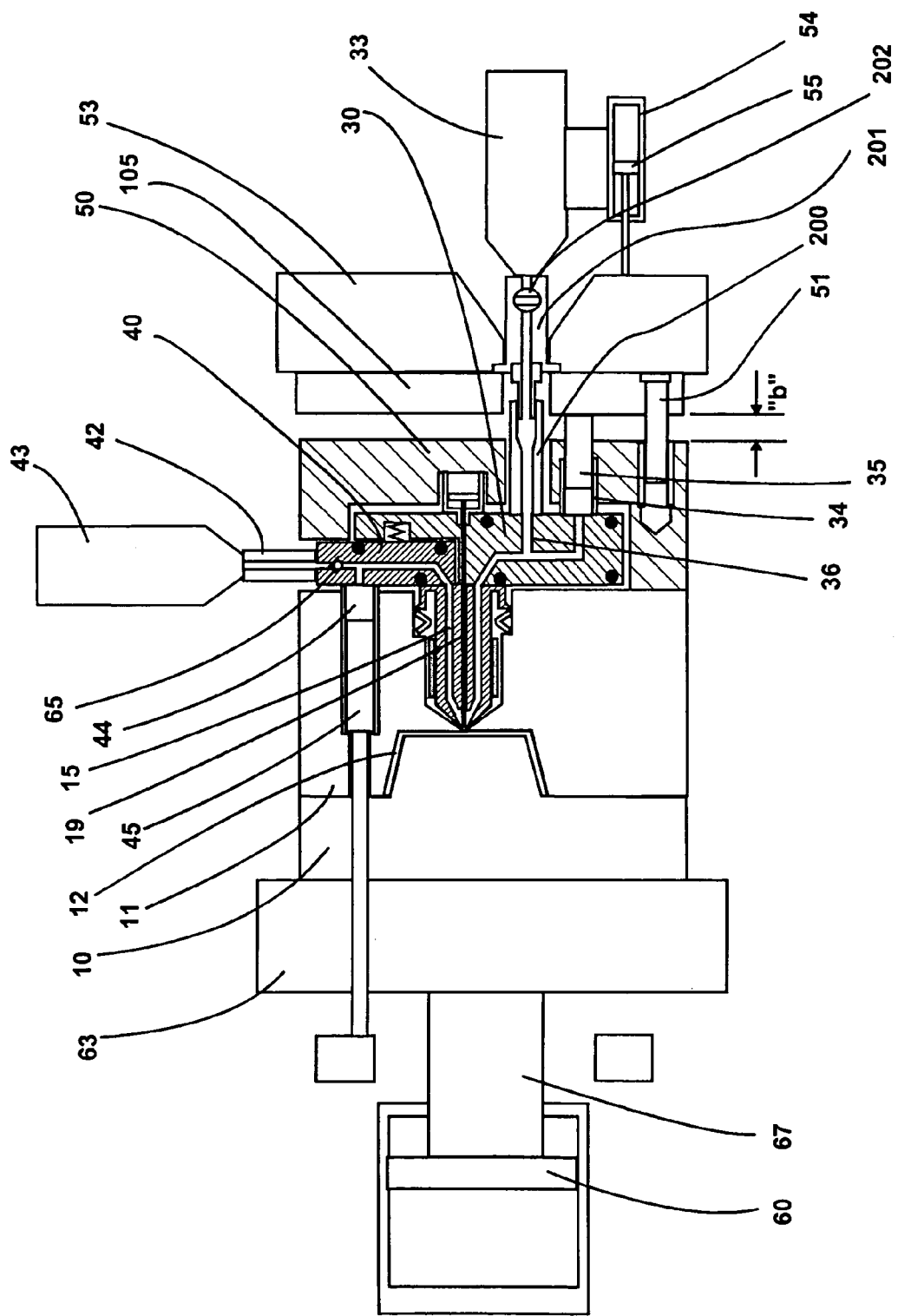
FIG. 4 is a schematic section view of a third embodiment of a coinjection hot runner mold having the hot runner mounted in a movable plate shown in the shooting pot charged position.

FIG. 4 shows a third embodiment somewhat similar to that shown in FIG. 3. In FIG. 4, the sprue bushing 200 has a similar channel configuration to accept a sliding spigot nozzle 201. The spigot nozzle 201 is part of the stationary mold assembly and is mounted to the back of the manifold backing plate 105, thereby allowing the configuration to be mounted and operated in a standard molding machine that does not require the modifications described in the first embodiment wherein the machine's control system is modified to cause the first injection unit's cylinder 54 to be programmed to cause the unit 33 to follow the motions of the moving mold section (cavity 11, hot runners 30 and 40 and manifold plate 50) as they move back and forth during each molding cycle, also thereby substantially increasing the wear on the seals in cylinder 54. Thus, as the movable portion of the mold either moves away from the manifold backing plate 105 or moves towards it, taking up distance "b", the sprue bushing and spigot remain engaged and sealed throughout the molding cycle.

The embodiments shown in FIGS. 3 and 4 are configured such that the metered shot of resin delivered by the first shooting pot to the cavity is reduced in volume by the amount of resin displaced by the relative movement of the sprue bushing and the spigot nozzle, since this displaced resin is also included in the manifold channel volume and cannot flow into the injection unit (since backflow is prevented in that direction by the check valve). That is, the melt which resides in the slidable spigot nozzle/sprue bushing channel is available to be injected into the nozzle as the movable manifold plate 50 moves toward the stationary platen 53 causing the first shooting pot 34 to discharge. Therefore, the first shooting pot 34 does not have to discharge a full shot of resin in order to fill the cavity 12 with a full shot of melt. A full injection shot of resin is provided by the melt of both the shooting pot and that residing in the slidable coupling.

In all the above embodiments, the second injection unit 43 is mounted on the movable hot runner manifold portion of the mold and travels therewith. The second injection unit 43 supplies the "C" resin, typically a barrier material, for the system. Since the amount of this resin per molding shot is very small compared to the "A" resin of the first shot material, the second injection unit 43 is comparatively small, compact, and lightweight. By attaching the second injection unit to the movable manifold section of the mold, a simpler machine construction results with less chance of resin leakage.

6. CONCLUSION

Advantageous features according to the present invention include:

- The sealed coupling of the injection nozzle to the hot runner sprue bushing during its motion in a molding cycle.
- In the spigotted embodiments, adding the displaced volume of resin caused by the spigot movement in the sprue bushing to the metered shooting pot volume to create a predetermined volume of resin injected into the mold cavity by the movement of both elements (spigot and shooting pot piston).
- Mounting the second injection unit to the movable manifold mold portion.

Thus, what has been described is a method and apparatus for effectively and reliably sealing an injection sprue bushing to a hot runner manifold throughout the relative movement thereof during a molding cycle.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patents and patent applications discussed above are hereby incorporated by reference into the Detailed Description of the Preferred Embodiments.

What is claimed is:

1. An injection molding sealing apparatus configured to be installed in a coinjection hot runner with a coinjection nozzle, the coinjection nozzle having at least two melt channels ending at the same gate, said sealing apparatus being configured for sealing the coinjection hot runner to a coinjection molding hot runner sprue bushing, which is coupled to an injection assembly, during relative movement between (i) the coinjection hot runner and (ii) a stationary mold or machine section, said apparatus comprising:

sealing structure configured to seal the coinjection molding hot runner sprue bushing to the coinjection hot runner during relative movement between the coinjection hot runner and the injection assembly; and coupling structure configured to provide relative movement between the injection assembly and the stationary mold or machine section.

2. Apparatus according to claim 1, wherein said coupling structure comprises (i) a piston configured to be coupled to one of the injection assembly and the stationary mold or machine section, and (ii) a cylinder configured to be coupled to the other one of the injection assembly and the stationary mold or machine section.

3. Apparatus according to claim 1, wherein the coinjection hot runner is movable and the stationary mold or machine section comprises a stationary platen, and wherein said coupling structure is coupled to the injection assembly and the stationary platen.

4. Apparatus according to claim 3, further comprising structure configured to couple a second injection assembly to the movable coinjection hot runner such that the second injection assembly and the injection assembly move together with the coinjection hot runner.

5. An injection molding sealing apparatus configured to be installed in a coinjection hot runner with a coinjection nozzle, the coinjection nozzle having at least two melt channels ending at the same gate, said sealing apparatus being configured for sealing the coinjection hot runner to a coinjection molding hot runner sprue bushing, which is coupled to an injection assembly, during relative movement between (i) the coinjection hot runner and (ii) a stationary mold or machine section, said apparatus comprising:

sealing structure configured to seal the coinjection molding hot runner sprue bushing to the coinjection hot runner during the relative movement;

coupling structure configured to provide relative movement between the injection assembly and the stationary mold or machine section;

the coinjection molding hot runner sprue bushing; and an injection assembly spigot nozzle slidably coupled to said coinjection molding hot runner sprue bushing, said injection assembly spigot nozzle being configured to provide relative movement between the injection assembly and said coinjection molding hot runner sprue bushing.

6. An injection molding sealing apparatus configured to be installed in a coinjection hot runner with a coinjection nozzle, the coinjection nozzle having at least two melt channels ending at the same gate, said sealing apparatus being configured for sealing the coinjection hot runner to a coinjection molding hot runner sprue bushing, which is coupled to an injection assembly, during relative movement between (i) the coinjection hot runner and (ii) a stationary mold or machine section, said apparatus comprising:

sealing structure configured to seal the coinjection molding hot runner sprue bushing to the coinjection hot runner during the relative movement;

coupling structure configured to provide relative movement between the injection assembly and the stationary mold or machine section;

a shooting pot configured to (i) be coupled to the movable coinjection hot runner, and (ii) hold less than a full shot of melt to be injected through the coinjection nozzle; and a shooting pot piston coupled to said shooting pot and configured to inject the melt in said shooting pot through the coinjection nozzle upon the relative movement between the movable coinjection hot runner and the stationary mold or machine section;

said shooting pot and said shooting pot piston, in combination, being configured to inject a full shot of melt through the coinjection nozzle upon the relative movement between (i) the coinjection hot runner and (ii) a stationary mold or machine section.

7. An injection molding sealing apparatus configured to be installed in a coinjection hot runner with a coinjection nozzle, the coinjection nozzle having at least two melt channels ending at the same gate, said sealing apparatus being configured to seal (i) the coinjection hot runner, which is relatively movable with respect to a relatively stationary platen, and (ii) a hot runner sprue bushing, said apparatus comprising:

a shooting pot configured to be coupled to the coinjection hot runner;

a shooting pot piston configured to discharge melt from said shooting pot upon relative movement of the coinjection hot runner and said platen;

the hot runner sprue bushing configured to be fixedly coupled to the coinjection hot runner;

an injection unit coupled to said hot runner sprue bushing; and coupling structure configured to couple said injection unit to said platen so that said injection unit is relatively movable with respect to said platen.

8. Apparatus according to claim 7, wherein said coupling structure comprises (i) a piston coupled to said relatively stationary platen, and (ii) a cylinder coupled to said injection unit.

9. Apparatus according to claim 7, wherein the coinjection hot runner is fixedly coupled to a mold cavity plate, and further comprising the coinjection nozzle configured to be coupled to the coinjection hot runner and to inject melt discharged from said shooting pot into a mold cavity in the cavity plate.

10. Apparatus according to claim 7, wherein said injection unit is configured to (i) inject melt through said hot runner sprue bushing into said shooting pot, and (ii) cause the melt injection to move said coinjection hot runner relatively away from the relatively stationary platen.

11. Apparatus according to claim 10, further comprising drive structure configured to move the coinjection hot runner relatively toward the relatively stationary platen, this relative toward movement causing said shooting pot piston to discharge the melt from said shooting pot.

12. Apparatus according to claim 7, further comprising:

a second shooting pot configured to be coupled to a second coinjection hot runner, which is relatively movable with respect to the relatively stationary platen;

a second shooting pot piston configured to discharge a second melt from said second shooting pot;

a second hot runner sprue bushing configured to be fixedly coupled to the second coinjection hot runner; and a second injection unit coupled to said second hot runner sprue bushing.

13. Apparatus according to claim 12, wherein the second coinjection hot runner is coupled to the coinjection hot runner.

14. Apparatus according to claim 13, wherein a mold cavity plate is coupled to the second coinjection hot runner and to the coinjection hot runner, and wherein a mold core plate is disposed to be movable with respect to the mold cavity plate, and wherein said second shooting pot is configured to be disposed in the mold cavity plate, and wherein said second shooting pot piston is disposed parallel to said coinjection nozzle and is configured to extend from the mold cavity plate through the mold core plate.

15. Apparatus according to claim 14, wherein relative movement of the coinjection hot runner toward the platen causes said shooting pot piston to discharge melt from said shooting pot, and wherein injection of melt from said injection unit through said hot runner sprue bushing into said shooting pot causes relative movement of the coinjection hot runner away from the platen.

16. Apparatus according to claim 7, further comprising a slidable coupling connecting said injection unit to said hot runner sprue bushing, and wherein relative movement of said coinjection hot runner toward said platen causes (i) said shooting pot piston to discharge melt from said shooting pot, and (ii) melt in said slidable coupling to be discharged toward said coinjection hot runner.

17. Apparatus according to claim 16, wherein said shooting pot is configured to hold less than a full shot of melt.

18. An injection molding apparatus configured to be installed in a coinjection hot runner with a coinjection nozzle, the coinjection nozzle having at least two melt channels ending at the same gate, said apparatus comprising:

a shooting pot configured to hold less than a full injection shot of melt;

a hot runner manifold configured to be in fluid communication with said shooting pot and the coinjection nozzle;

a sprue bushing configured to provide melt to said hot runner manifold;

an injection unit configured to provide melt to said sprue bushing; and a slidable melt coupling configured to slidably couple said injection unit to said sprue bushing so that relative movement of said injection unit with respect to said sprue bushing causes melt in said slidable melt coupling to move toward said melt manifold, said shooting pot and said slidable melt coupling being configured to hold a full injection shot of melt.

19. An injection molding sealing apparatus configured to be installed in a coinjection hot runner with a coinjection nozzle, the coinjection nozzle having at least two melt channels ending at the same gate, said apparatus comprising:

a sprue bushing configured to be fixedly coupled to a hot runner manifold so as to maintain a seal therebetween throughout a relative movement between the hot runner manifold and an injection unit; and the injection unit being configured to be movably coupled to a platen and fixedly coupled to said sprue bushing.

20. An injection molding sealing apparatus configured to be installed in a coinjection hot runner with a coinjection nozzle, the coinjection nozzle having at least two melt channels ending at the same gate, said apparatus comprising:

means for injecting a melt from an injection unit, which is coupled to a stationary platen, through a sprue bushing, into a hot runner manifold, and into a shooting pot, said means for injecting causing the hot runner manifold and the platen to move away from each other;

means for sealing the sprue bushing to the hot runner manifold throughout the movement away;

means for causing the hot runner manifold and the platen to move toward each other, the movement toward causing the melt in the shooting pot to be discharged toward the coinjection nozzle, the means for sealing sealing the sprue bushing to the hot runner manifold throughout the movement toward.

* * * * *